(12) United States Patent
Srinivasa

(10) Patent No.: US 6,987,772 B2
(45) Date of Patent: Jan. 17, 2006

(54) EFFICIENT BROADCASTING OVER A FULLY CONNECTED NETWORK

(75) Inventor: Deepak M Srinivasa, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 946 days.

(21) Appl. No.: 09/997,032

(22) Filed: Nov. 28, 2001

(65) Prior Publication Data

US 2003/0103502 A1    Jun. 5, 2003

(51) Int. Cl.
*H04L 12/56*    (2006.01)

(52) U.S. Cl. .................. 370/406; 370/394; 370/432; 370/473; 370/474; 718/105

(58) Field of Classification Search ............ 370/390, 370/432, 406, 473, 474, 394; 707/2, 10; 718/105, 104
See application file for complete search history.

(56) References Cited

U.S. PATENT DOCUMENTS

| | | | |
|---|---|---|---|
| 5,056,085 A | 10/1991 | Vu | 370/400 |
| 6,542,511 B1 * | 4/2003 | Livermore et al. | 370/406 |
| 6,665,311 B2 * | 12/2003 | Kondylis et al. | 370/462 |
| 6,721,335 B1 * | 4/2004 | Gregg | 370/473 |

* cited by examiner

*Primary Examiner*—Chi Pham
*Assistant Examiner*—Kerri M. Dyke
(74) *Attorney, Agent, or Firm*—T. Rao Coca; Anthony V S England (57) ABSTRACT

This invention provides a method, system and computer program product for reducing transmission time and improving network utilization while broadcasting over a filly connected network, wherein it comprises simultaneous transmission of individual sequential packets by the broadcaster to each recipient in a round robin sequence until all the packets have been transmitted, retransmission of received packets by each recipients to each other recipient, and reassembly of received packets at each recipient in the original sequence of said transmission. The said transmission and said retransmission are overlapped in time.

18 Claims, 6 Drawing Sheets

EFFICIENT BROADCASTING OVER A FULLY CONNECTED NETWORK

FIELD OF THE INVENTION

This invention relates to the field of broadcasting a message by the sender that is broadcaster to all others in the network, over a fully connected network. The purpose of the invention is to reduce transmission time and improving network utilization while broadcasting over a fully connected network.

BACKGROUND OF THE INVENTION

A station (node or computer) in a computer network sending information to all the other stations in the network is termed as broadcasting. A completely connected network, is a network where each node is connected to every other node. By a completely connected network, it is meant that there is always a direct network connection between any two given stations in the network.

The applications of broadcasting are well known in the literature of computer networks. Some of them are mentioned here with a special emphasis based on the possibility of these applications requiring broadcasting over completely connected networks.

Mission critical high-speed real-time networks almost always tend to have the completely connected characteristic due to the inherent advantage the setup provides in terms of speed.

Distributed databases require performing the operation of synchronizing data frequently. For performance reasons, these distributed databases will generally be completely connected. Whenever one or more rows of data is updated in one of the database servers in the network, the remaining servers need to be brought in sync with the source server.

In general, other applications like exchange of routing information between the routers of a Wide Area Network or communication between the admin stations of a large network (which will be completely connected, if not the whole network) will require broadcasting over completely connected networks.

Several more applications in a variety of fields like Simulation, Control Systems etc. require the broadcast of information over completely connected networks.

Standard Techniques proposed for broadcast routing include direct routing, flooding, minimum spanning tree routing, multi-destination routing and reverse path forwarding. However, all these algorithms are designed for a general network. The advantages of the above algorithms fail to be realized when the network is fully connected.

Direct Routing: Source S transmits all the packets to all the remaining stations in the network. S sends the first of "p" packets on all the (n−1) lines connecting to the remaining n−1 stations in the first unit of time, the second packet in the second unit of time and so on. This process continues for p units of time, by then all the stations would have received all the broadcast packets.

Flooding: Source S sends packets to all its connected neighbours and then each station that receives a packet sends it out again on the lines other than the line from where it came in. This technique is suitable for general networks. It is unnecessary and unsuitable for completely connected networks for the simple reason that after the first transmission, all the stations would have that packet and hence there will be no need to flood further. Thus this method is not applicable for the cases of completely connected networks.

Minimum Spanning Tree Routing: A minimum spanning tree rooted at the source S is formed for the entire network and then the packets are sent by each receiver to all of its children. The packets are received from the single parent of the station with respect to the minimum spanning tree constructed. However, for the completely connected networks, this method reduces to the direct routing method.

Both Multi-destination Routing and Reverse Path Forwarding: are methods that are suitable for networks that are not fully connected, and when the hop count for the packets is more than one. However, in fully connected networks the hop count for a packet from source to destination is one hence these methods are reduced to the direct routing method.

The above methods (other than the direct routing method) proposed are only useful for general cases of networks. All of these methods reduce to direct routing for completely connected networks.

Furthermore these methods do not utilize the special properties of fully connected networks to achieve efficiency.

For a fully connected network having five nodes, in the direct routing method only 4 out of 10 lines are used for this broadcast. For the duration of the transmission, these four lines are completely loaded while the remaining 6 lines remain unutilized (assuming that no other transmission is taking place). Thus we have a network that is loaded for a long time in only 40% of the area while the remaining 60% is idle. This ratio becomes worse as the size of the network increases.

U.S. Pat. No. 5,056,085 describes a Flood-and-Forward broadcasting technique that aims to minimize transmission delay. However, while this technique is effective for partially connected networks it is not optimal for fully connected networks, as it does not exploit the specific facilities that are unique to such a network.

THE OBJECTS AND SUMMARY OF THE INVENTION

The object of this invention is to obviate the above drawback by providing an efficient distribution of the load over the entire network during a single broadcast.

The second object of the invention is to minimize the time taken for the broadcast.

To achieve the said objective the invention provides a method for reducing transmission time and improving network utilization while broadcasting over a fully connected network, comprising the steps of:

simultaneously transmitting individual sequential packets by the broadcaster to each recipient in a round robin sequence until all the packets have been transmitted, retransmitting received packets by each recipient to each other recipient, and reassembling received packets at each recipient in the original sequence of said transmission.

said transmitting step and said retransmitting step being overlapped in time.

The above method includes storing packets received from said broadcaster by said recipient in two buffers namely, standard buffer and extra buffer and storing packets received from other recipients only in said standard buffer.

The above method includes retransmitting using a two step process, retransmitting to recipients with Ids lower than the transmitting recipient in the first step, and retransmitting to all recipients with Ids higher than the transmitting recipient in the second step.

The said transmitting and retransmitting step is in half duplex mode.

The said retransmitting step is in full duplex mode.

The above method uses a single buffer for storing received packets at a recipient, wherein packets received from said broadcaster are inserted at the beginning of said buffer while packets received from other recipients are stored after a defined position in said buffer.

The present invention also provides a system for reducing transmission time and improving network utilization while broadcasting over a fully connected network, comprising:

means for transmitting individual sequential packets simultaneously by the broadcaster to each recipient in a round robin sequence until all the packets have been transmitted,     means for retransmitting received packets by each recipient to each other recipient, and     means for reassembling received packets at each recipient in the original sequence of said transmission said transmitting means and said retransmitting means operating simultaneously.

The above system includes means for storing said packets received by each recipient from said broadcaster in two buffers storage means namely, standard buffer and extra buffer while storing said packets received from other recipients in said standard buffer.

The above system further includes means for retransmitting said recipients with Ids lower than the transmitting recipient in the first step followed by retransmitting to all said recipients with Ids higher than the transmitting recipient.

The said transmitting and retransmitting means operate in half duplex mode.

The said retransmitting means operate in full duplex mode.

The said system includes means for storing said packets received by each recipient using a single buffer means, wherein packets received from said broadcaster are inserted at the beginning of said buffer means while packets received from other recipients are stored after a defined position in said buffer means.

The present invention further provides a computer program product comprising computer readable program code stored on a computer readable storage medium embodied therein for reducing transmission time and improving network utilization while broadcasting over a fully connected network, comprising:

computer readable program code means configured for transmitting of individual sequential packets simultaneously by the broadcaster to each recipient in a round robin sequence until all the packets have been transmitted,     computer readable program code means configured for retransmitting of received packets by each recipient to each other recipient, and     computer readable program code means configured for reassembling received packets at each recipient in the original sequence of said transmission said transmitting and said retransmitting being overlapped in time.

The above computer program product includes computer readable program code means configured for storing said packets received by each recipient from said broadcaster in two buffers namely, standard buffer and extra buffer while storing said packets received from other recipients in said standard buffer.

The above computer program product includes computer readable program code means configured for retransmitting to said recipients with Ids lower than the transmitting recipient in the first step followed by retransmitting to all said recipients with Ids higher than the transmitting recipient.

The above computer program product includes computer readable program code means configured for operating said transmission and retransmission in half duplex mode.

The said computer program product includes computer readable program code means configured for operating said retransmission in full duplex mode.

The above computer program product includes computer readable program code means for storing said packets received by each recipient using a single buffer, wherein packets received from said broadcaster are inserted at the beginning of said buffer while packets received from other recipients are stored after a defined position in said buffer.

BRIEF DESCRIPTION OF THE DRAWINGS

The invention will now be described with reference to the accompanying drawings.

DETAILED DESCRIPTION

Figure 1:
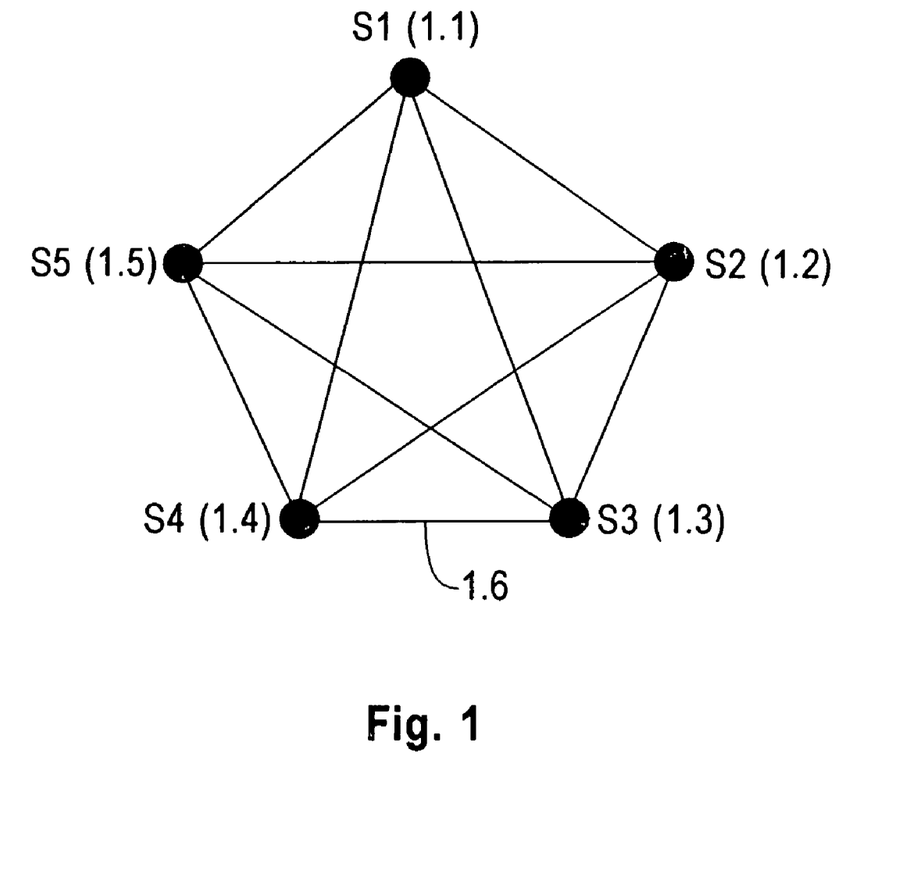
FIG. 1 shows a completely connected network.

FIG. 1 shows a completely connected network. (1.1), (1.2), (1.3), (1.4) and (1.5) are the nodes of the completely connected network (also called a station or a computer). These nodes are interconnected with each other using the connection medium (1.6), which is the connection medium.

The invention not only provides for better distribution of load over the entire network, but also manages to reduce the total time of transmission. The following points are to be noted.

1. Every station is assigned a station_id, which is a unique positive integer.
2. The allocation of station_ids is done during network start-up. The numbering starts from 1 and never exceeds the total number of stations in the network.
3. One of the stations called source (broadcaster) S has 'p' packets to be broadcast. The other stations are called recipients. Every packet has its sequence number recorded in it, in addition to the data that it carries. This will then be used by recipients to resequence the received packets into proper order.
4. Every station (broadcaster as well as recipients) has a "standard_buffer" that can hold packets. In the case of a broadcaster, this standard_buffer will be initially full (with 'p' packets in it) and will become empty during the course of transmission. In the case of recipients, this standard_buffer will be initially empty and will eventually be filled up, with 'p' packets, by the time the broadcast completes.

5. In addition to the standard_buffer, every station that acts as a recipient in a particular broadcast makes use of another buffer called "extra_buffer", that is used to store those received packets that need to be transmitted to other recipients. We note that this extra_buffer is present in every station, but the one that acts as a broadcaster for a particular transmission doesn't make use of it.

6. Each buffer (both standard_buffer and extra_buffer) acts as a queue. A new packet can be inserted at the end of the queue and a deletion operation results in the removal of a packet from the start of the queue.

Figure 2:
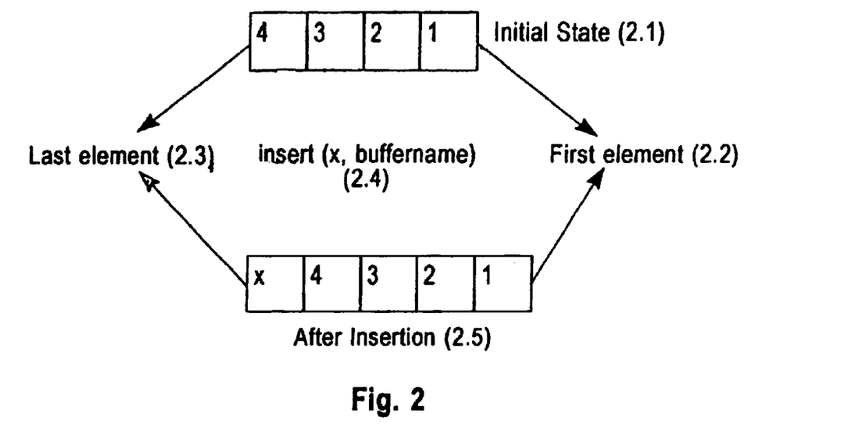
FIG. 2 shows the insertion operation in a buffer functioning like a queue.

FIG. 2 shows the insertion operation in a buffer acting as a queue. 2.1 is a buffer initially having four elements viz. 1,2,3,4. The first element (2.2) of the buffer that is 1. The last element of the buffer is 4. After the insert operation (2.4), wherein 'x' is inserted in the buffer, the buffer assumes the structure as shown in 2.5. The first element (2.2) is still 1. Last element (2.3) now is 'x'.

Figure 3:
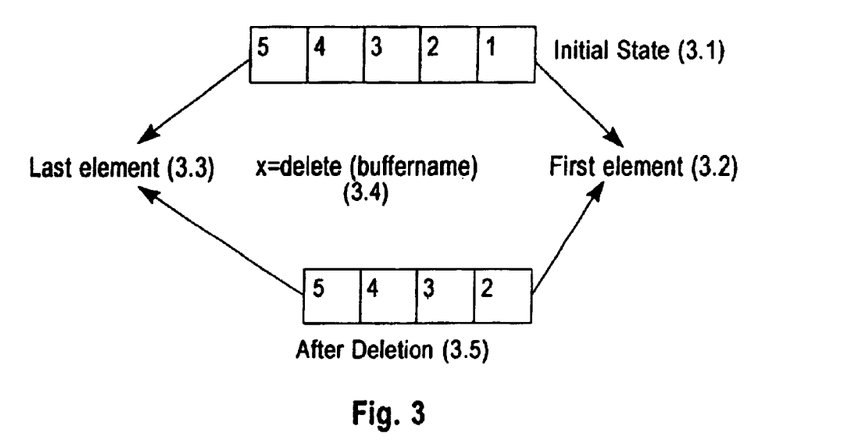
FIG. 3 shows the deletion operation in a buffer functioning like a queue.

FIG. 3 shows the deletion operation in a buffer acting as a queue. 3.1 is a buffer initially having five elements viz. 1, 2, 3, 4, 5. The first element (3.2) of the buffer that is 1. The last element of the buffer is 5. After the delete operation (3.4), the buffer assumes the structure as shown in 3.5. The last element (3.3) is still 5. But the first element (3.2) now is 2.

7. For the algorithm, it is assumed that the variable 'station_id' is initialized to the station's own id and the variable 'total_no_stations' is initialised to the total number of stations in the network. This initialization is done during network start-up.

8. The function send_packet (packet, destination_station) sends the said 'packet' on the line connecting the station executing this method and the 'destination_station'.

9. The function receive_packet( ) is a blocking call, which returns only when a packet arrives in one of the network lines connected to the station. The set of packets that arrive is returned as a packet array to the calling function.

10. One important assumption that is made here (only for the purposes of simplifying the explanation) is that the transmission time for a packet to travel from one station to another is much higher than the time taken for the execution of any of the functions given here at the stations. It therefore becomes necessary for us to use a waiting method that precisely sleeps the process handling the broadcast for one transmission cycle time whenever necessary. This is done so that the different routines of the algorithm are synchronized and perform their functions accurately. This is implemented by the wait( ) method.

The invention is now presented as a collection of three routines. They are:

1. The Sending Routine for the 'Broadcaster'.

Figure 4:
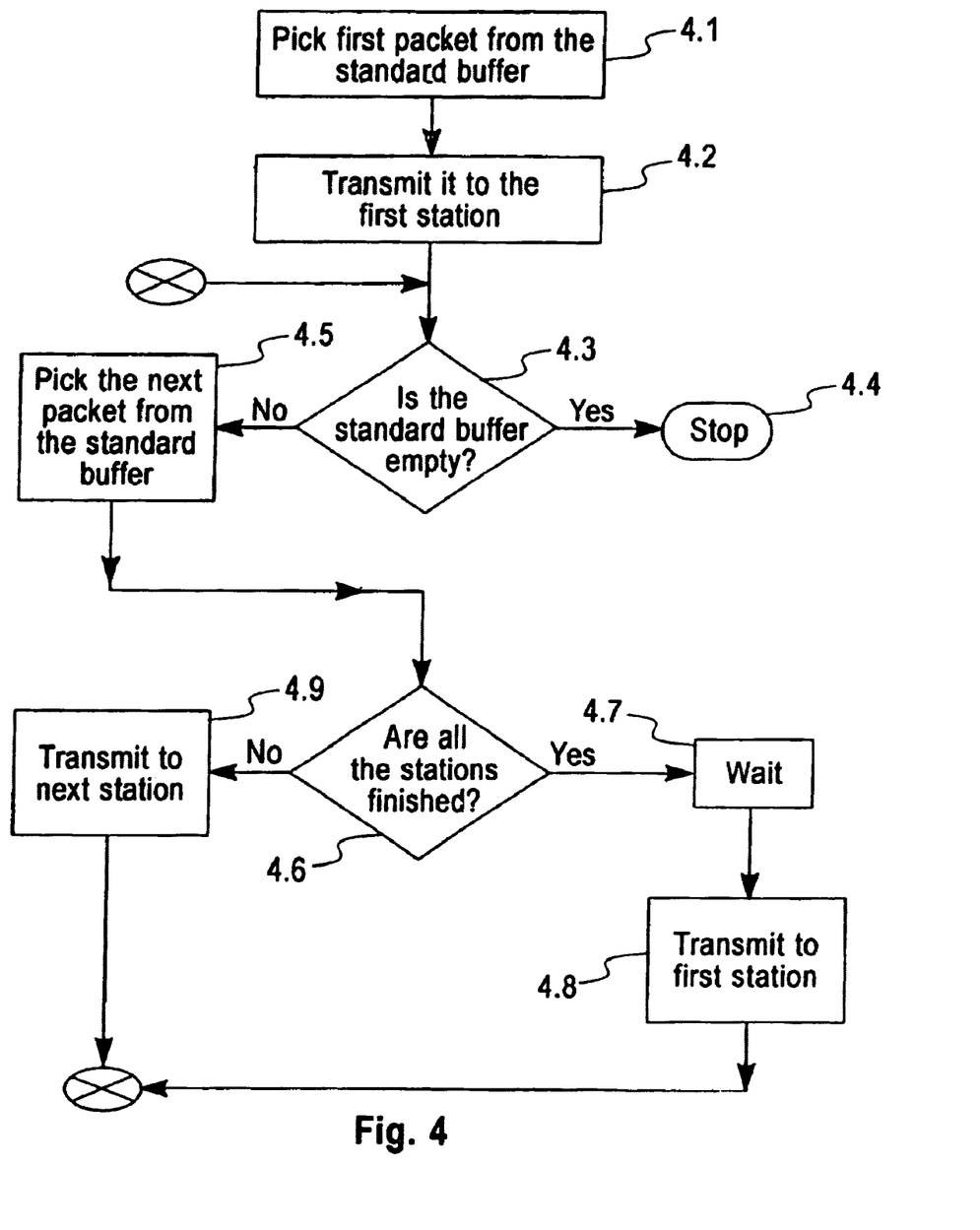
FIG. 4 shows a flowchart depicting the send routine for the broadcaster.

FIG. 4 is the flowchart depicting the send routine for the broadcaster. The broadcaster picks the first packet from its standard buffer (4.1). It then transmits this packet to the first station (4.2). Thereafter the broadcaster checks whether its standard buffer is empty (4.3). If it is, then the broadcater stops sending packets (4.4). If it is not then the broadcaster picks up the next packet (4.5). Then it checks whether all the stations are exhausted (4.6). If so, then it waits for the previous transmission to complete (4.7) and then transmits the present packet to the first station (4.8) else it transmits the packet to the next station (4.8). After this step, the broadcaster again checks whether its standard buffer is empty (4.3). This process continues till all the packets in the standard buffer are exhausted.

2. The Receiving Routine for a Recipient

Figure 5:
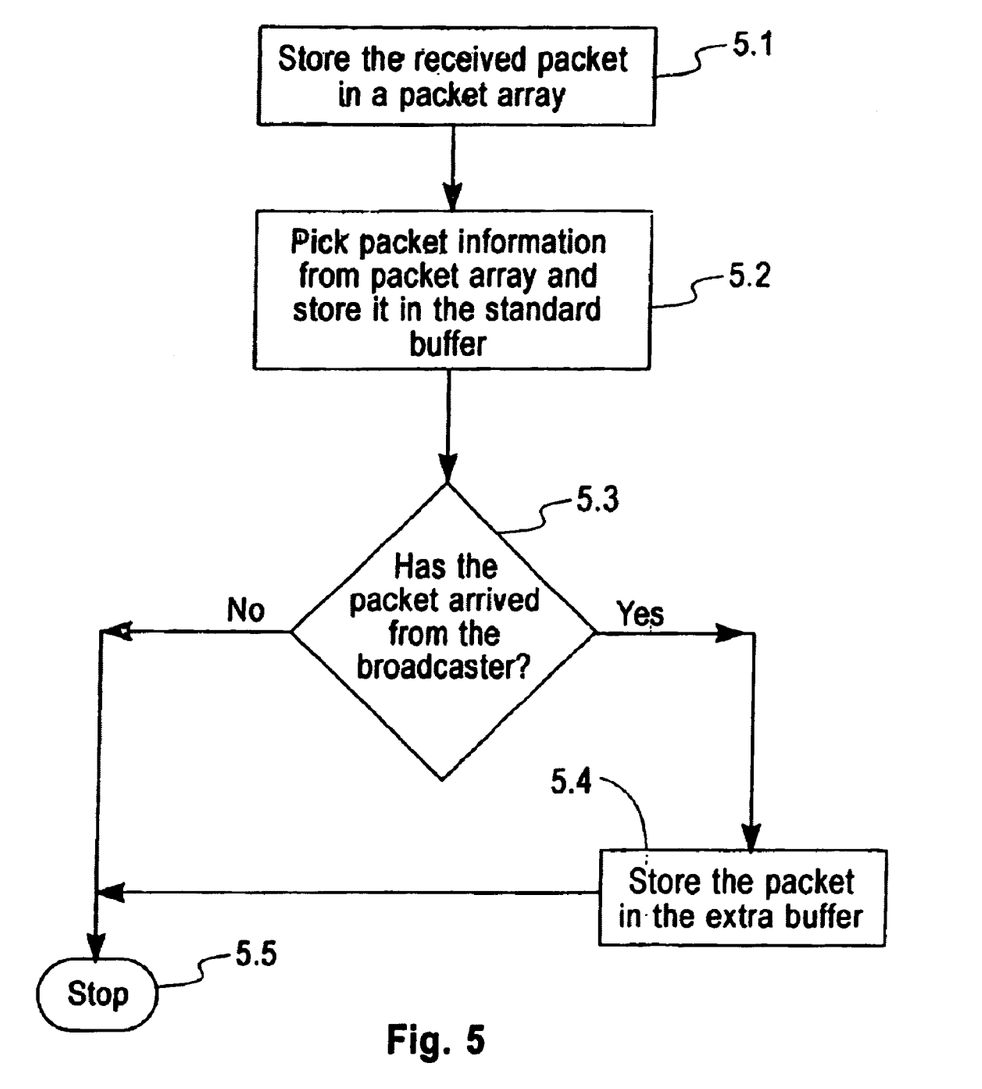
FIG. 5 shows a flowchart depicting the receive routine of a recipient.

FIG. 5 is the flowchart depicting the receive routine for a recipient. The packet received is stored in a packet array (5.1). Packet is picked from the packet array and it is stored in the standard buffer (5.2). The recipient checks that whether the packet received is from the broadcaster (5.3). If yes, then the packet is also stored in the extra buffer (5.4). And if no, then no action is taken. In both the cases the receive routine ends here (5.5).

3. The Sending Routine for a Recipient

Figure 6:
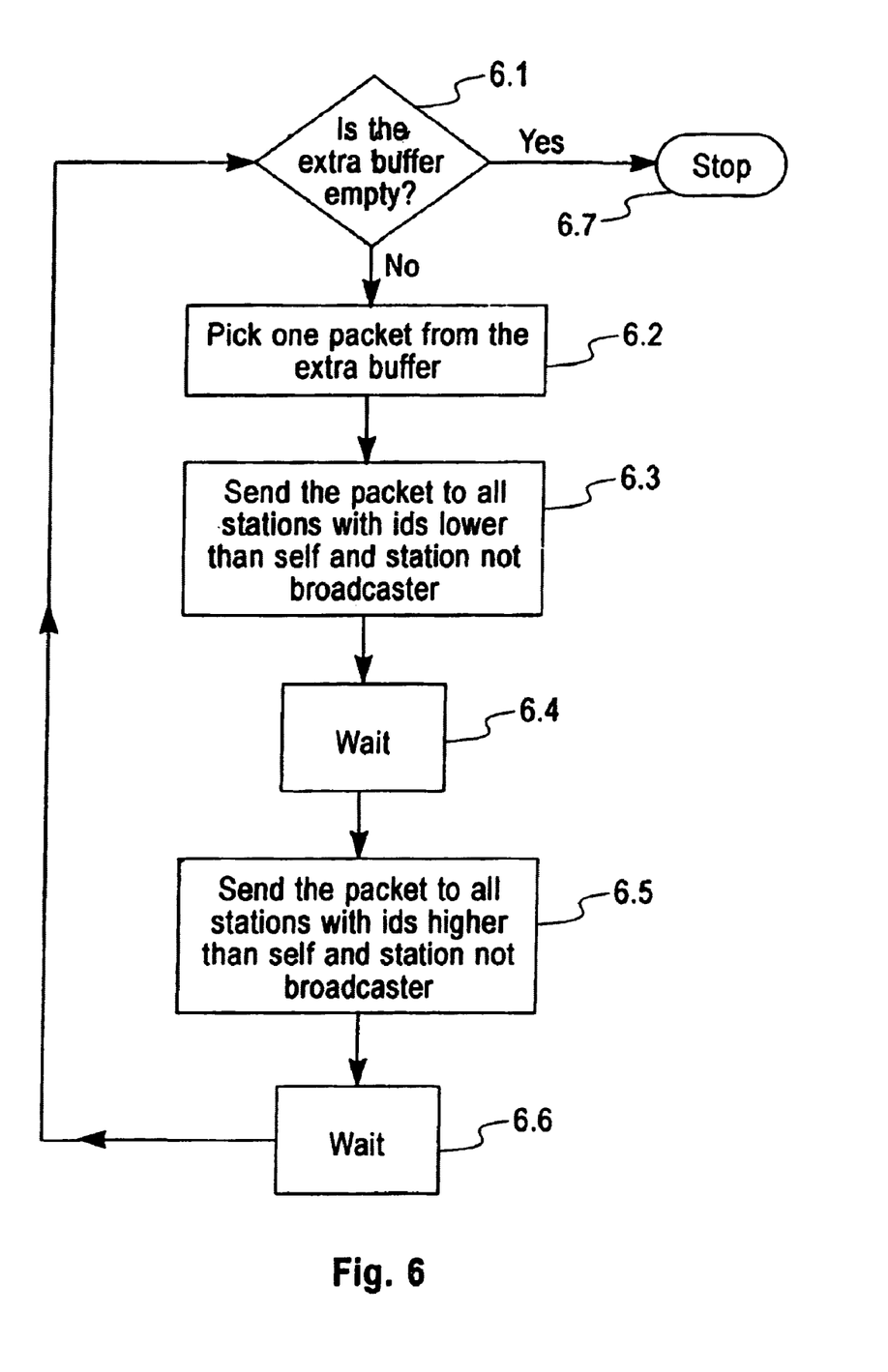
FIG. 6 shows a flowchart depicting the send routine for a recipient.

FIG. 6 is a flowchart depicting the sending routine for a recipient. The recipient checks whether its extra buffer is empty (6.1). If yes, the process is over (6.7) else it picks one packet from the extra buffer (6.2). It then transmits this packet to all the stations having ids lower than itself but not the broadcaster (6.3). It waits for the transmission to finish (6.4). After the wait period it transmits the packet to all the stations having ids higher than self but not the broadcaster (6.5). After the transmission finishes (6.6), the recipient again checks the extra buffer (6.1) and repeats the above steps.

The broadcaster continuously transmits different packets to all the remaining stations in a round robin fashion until it exhausts all the packets to be broadcast. Thus in the first unit of broadcast time, the broadcaster sends (n−1) packets, one to each of the (n−1) stations, where n is the total number of stations in the network. If we assume that the broadcaster's id is 1, then the second station gets the $1^{st}$ packet, the third station gets the $2^{nd}$ packet and so on. All this is achieved in one unit of transmission time. During the second unit of broadcast time, the broadcaster continues in a similar fashion to dispatch the next (n−1) packets to the (n−1) stations in the same order. We note here that no two stations receive the same packets from the broadcaster during the entire transmission.

The Recipients Perform the Following Two Tasks:

1. To receive all the incoming packets and put them in the standard_buffer. The contents of the standard_buffer will be then dispatched to the concerned process after the broadcast is finished.

2. To send those packets received from the broadcaster to all the stations other than itself and the broadcaster. For accomplishing this task, all those packets received from the broadcaster are also copied into the extra_buffer. The sending of these packets to the other stations is performed in two steps taking two units of transmission time. In the first unit of time, the current packet is sent to all stations numbered lower than the current station excluding the broadcaster. In the second unit of transmission time, the current packet is sent to all stations numbered higher than the current station excluding the broadcaster. This method achieves two important advantages:

Every line in the network is utilized.

No clashes or collisions of any sort occur.

In summary the entire process is a three-step process. These three steps then keep repeating until all the packets have been broadcast. Let us assume for example, the network has 5 stations, and the station numbered 5 is the broadcaster, which has to broadcast 10 packets to all the remaining four stations. The whole transmission is divided into cycles. In each cycle, (n−1) packets are broadcast to the stations. In this case, in each cycle, 4 packets are broadcast to the stations. Then these cycles repeat until all the packets are broadcast. In this case, it takes 3 cycles for broadcasting 10 packets—4 in the first cycle, 4 in the second cycle and the remaining 2 in the last cycle. Each cycle takes three units of transmission time (one unit per step). But, there will be overlap between cycles and hence the total time consumed will be less than three times the number of cycles.

The first step of the second cycle begins by the broadcaster sending packet 5 to station 1, packet 6 to station 2 and so on.

In the first step of the cycle lasting one unit of transmission time, the broadcaster sends out one packet to each of the other stations. The packets sent out are all different and hence (n−1) packets are transmitted from the total set of packets to be broadcast. At the end of this first unit of transmission time, each of the (n−1) recipients have a unique packet available.

In the second and the third steps, these stations exchange amongst themselves the different packets that they have received so that by the end of this cycle, each of the (n−1) recipients have all the (n−1) packets that the broadcaster sent out in the first step. This is achieved by a simple non-collision arbitration mechanism.

Thus, in the second step, each of the stations send out the packet received from the broadcaster in the first step to all stations numbered lower than themselves, not including the broadcaster. This ensures that all the lines between these recipients (i.e. all the lines in the sub-network excluding the broadcaster) are utilized and there are no collisions. In the final step of the cycle, the stations send the same packet received in the first step to the stations numbered higher than themselves. After this step, all the stations have the (n−1) packets sent out by the broadcaster in the first step. These cycles repeat until the broadcast completes.

Figure 7:
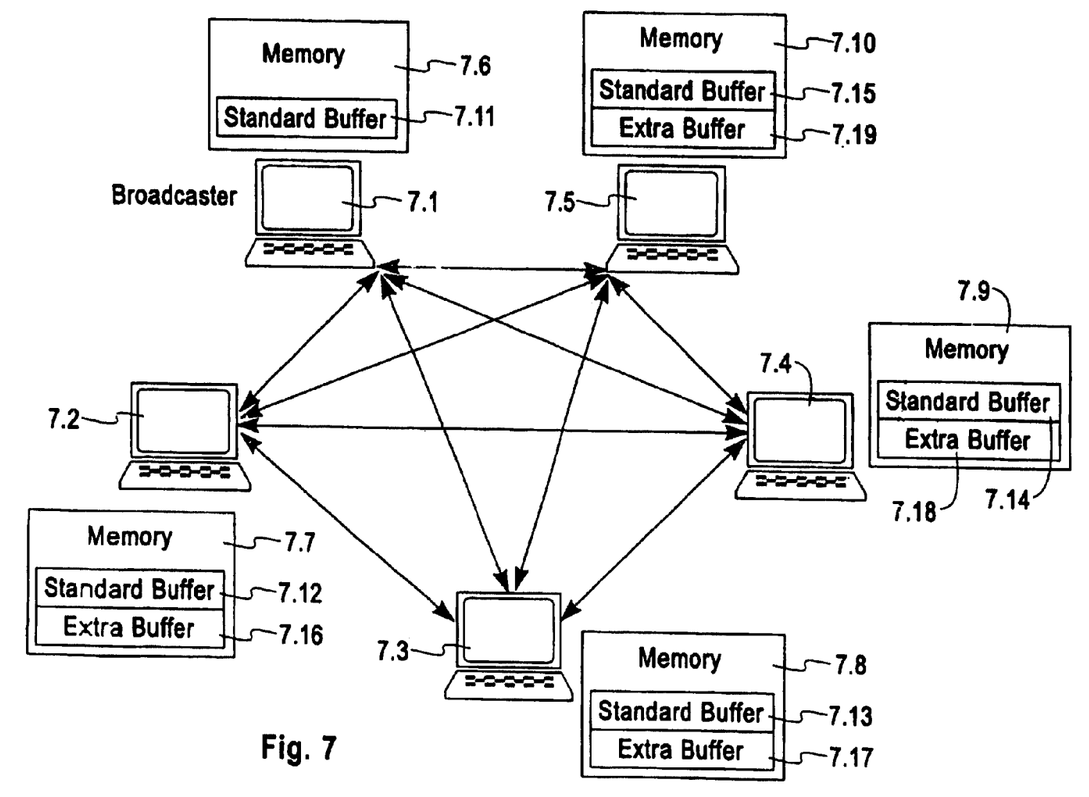
FIG. 7 shows a fully connected network, according to this invention.

FIG. 7 shows an arrangement according to this invention on a fully connected network comprising a broadcaster system (7.1) and recipient nodes [(7.2) through (7.5)]. The broadcaster (7.1) has a standard-buffer (7.11) located in its internal memory (7.6) containing the data packets that are to be broadcast. The internal memory [(7.7) through (7.10)] of each recipient node contains a standard-buffer [(7.12) through (7.15)] for storing each received packet, as well as an extra-buffer [(7.16 through (7.19)] for storing those data-packets that are to be retransmitted to other recipient nodes.

Table 1 shows a matrix known as the "load-matrix", for the entire transmission for the example of broadcasting 10 packets from station 5 to the remaining stations for the case of half-duplex communication between the stations. In the matrix shown below, each row represents a network line. Each column represents a single unit of transmission time. Every cell in this matrix identifies the occurrence and the direction of the defined packet on a particular network line. An empty cell indicates no transmission.

TABLE 1

| n/w line | Time unit 1 | time unit 2 | time unit 3 | time unit 4 | time unit 5 | time unit 6 | time unit 7 |
|---|---|---|---|---|---|---|---|
| 5-1 line | 5 → 1 (1) | 5 → 1 (5) | 5 → 1 (9) | | | | |
| 5-2 line | 5 → 2 (2) | 5 → 2 (6) | 5 → 2 (10) | | | | |
| 5-3 line | 5 → 3 (3) | 5 → 3 (7) | | | | | |
| 5-4 line | 5 → 4 (4) | 5 → 4 (8) | | | | | |
| 4-1 line | | 4 → 1 (4) | 1 → 4 (1) | 4 → 1 (8) | 1 → 4 (5) | | 1 → 4 (9) |
| 4-2 | | 4 → 2 | 2 → 4 | 4 → 2 | 2 → 4 | | 2 → 4 |

TABLE 1-continued

| n/w line | Time unit 1 | time unit 2 | time unit 3 | time unit 4 | time unit 5 | time unit 6 | time unit 7 |
|---|---|---|---|---|---|---|---|
| line | | (4) | (2) | (8) | (6) | | (10) |
| 4-3 | | 4 → 3 | 3 → 4 | 4 → 3 | 3 → 4 | | |
| line | | (4) | (3) | (8) | (7) | | |
| 3-2 | | 4 → 2 | 2 → 3 | 3 → 2 | 2 → 3 | | 2 → 3 |
| line | | (3) | (2) | (7) | (6) | | (10) |
| 3-1 | | 3 → 1 | 1 → 3 | 3 → 1 | 1 → 3 | | 1 → 3 |
| line | | (3) | (1) | (7) | (5) | | (9) |
| 2-1 | | 2 → 1 | 1 → 2 | 2 → 1 | 1 → 2 | 2 → 1 | 1 → 2 |
| line | | (2) | (1) | (6) | (5) | (10) | (9) |

We observe that in the above example, the utilization of the network is higher than what it would have been if we had used direct routing. Also, we observe that the total time taken has reduced from 10 units in the case of direct routing to 7 units in this method. We note that this is a very simple example containing only 5 stations and broadcasting only 10 packets. In the general case where the number of stations will be high and lot of packets of data need to be broadcast, the advantages gained in terms of load distribution and timesaving will be considerable.

Time taken for the transmission in the two cases is estimated as follows. Let there be n stations in the network, and p packets to be broadcast.

For the case of direct routing, all the packets are sent from the broadcaster to all the recipients. Thus in the first unit of time, the first packet is sent to all the recipients and so on. So, the total time taken to broadcast p packets is 'p'.

Total time taken for direct routing broadcasting $(T_1)$=p

For the case of the current method, the time units consumed depend on whether p is divisible by (n−1) or not. Using this method, it takes two units of time to dispatch (n−1) packets. The first unit is the initial extra unit of time consumed extra before the pipelined distribution begins. Also, if p is not divisible by (n−1) then there will be two extra time units consumed to dispatch the remaining packets. Thus the time consumed can be calculated as follows.

if $[(p \mod (n-1))=0]$

Total time taken for the current method $(T_2)=2p/(n-1)+1$ else

Total time taken for the current method $(T_2)=2(p-p \mod (n-1))/(n-1)+3$

Consider the case when p is a multiple of (n−1). The time required for transmission is given by 2p/(n−1)+1. The following inequality defines the case when this method is more effective than the direct routing method.

$p>2p/(n-1)+1$ when $p>3$, $n>3$

The validity of the above equation is established as follows:

Divide the above inequality by p to get the following inequality.

$1>2/(n-1)+1/p$

For this inequality to be valid, the sum of the two terms on the right hand side should not exceed 1. For this, the obvious requirement is that the individual terms by themselves should not exceed 1. Lets take the first term 2/(n−1). We see that for all values of n>3, this term will be less than one and for values of n<=3, the term becomes greater or equal to 1. Therefore we shall keep n>3. Now to fix p, we will consider the worst value for n, i.e. 4. When n=4, 2/(n−1) will be ⅔. Even in this worst case, if we do not let p to be less than or equal to 3 then we can be sure that this term 1/p will not exceed ⅓. Therefore p>3 is a must if we first decide to fix n. However there could be other solutions to this inequality, but p>3 and n>3 is one such solution which is suitable for the purposes of this analysis.

Therefore, we conclude that this method will fare better than the direct routing method when the number of stations in the network is more than 3 and when the number of packets to be broadcast is greater than 3. We see that this condition is almost always true for any real application, and hence the proposed method is almost always better. Similar analysis can be provided for the case when p is not a multiple of (n−1). But, since in that case, the time consumed will be greater by 2 units only, it is easy to see that the algorithm would perform better even in that case.

Load Distribution can be analyzed as follows.

Load distribution is defined as:

$$\text{Load Distribution} = \frac{\text{Number of active cells in the load matrix}}{\text{Total number of cells in the load matrix}}$$

In any completely connected network with n stations, the number of network lines will be n(n−1)/2. This can be derived as follows. Since every one of the n stations is connected to each of the other (n−1) stations, there will be n(n−1) edges between them. But since a single network line serves as a bi-directional edge, we see that we have counted each edge twice. Therefore we have to cut our estimate by half. Hence the total number of network lines will be n(n−1)/2. This implies that the number of rows in the load matrix for both the direct routing and the current method will be n(n−1)/2.

Next, we note the following point. The total number of cells in the load matrix for any method is obtained by multiplying the number of rows and the number of columns. The number of columns represents the number of time units the method takes to finish the broadcast. Also, we note that the number of active cells for both the direct routing and the current method is the same, which will always be p(n−1). This can be realized as follows. In both the methods, by the end of the transmission, all the (n−1) recipients would have received p packets. This means that there were at least p(n−1) transmissions that took place. Now, it is clear from both the methods that no single transmission is redundant or wasted. That is, during the course of these broadcast methods, no station gets a packet that it already has and hence discards. Such a situation never arises. This means that there are no extra broadcasts and hence it means that the total number of transmissions that occur for both the methods is exactly p(n−1). So, the numerator terms in the load distribution of both the algorithms remain same. It is only the denominator that matters.

For the case of direct routing, the number of columns in the load matrix is the number of time units consumed for the transmission. This is $T_1$ (which is p) for direct routing. Therefore, the total number of cells in the load matrix for the direct routing case is $T_1 \cdot n(n-1)/2$. This will be the denominator term in the load distribution for the direct routing method.

$$\text{Load Distribution for direct routing} = \frac{2p}{T_1 \cdot n}$$

Similarly, for the case of the invention, only the denominator term will change. That is, the total number of cells in the load matrix for this case would be $T_2 \cdot n(n-1)/2$. Hence the load distribution will be:

$$\text{Load Distribution for current method} = \frac{2p}{T_2 \cdot n}$$

With these two expressions, it is easy to see that load distribution for the current method will be better since it has been established that $T_2$ will be smaller than $T_1$ when p>3 and n>3. This implies that under the same conditions, the load distribution for the current method will be better than the load distribution for the direct routing algorithm.

The above analysis applies for the case of half-duplex communication between the recipient stations. It is obvious that if the communication channel between the stations is capable of full-duplex operation, the broadcast time would further reduce for the case when the number of packets is greater than the number of stations, as this data exchange between two stations at each step would happen in a single time slot instead of two time slots.

I claim:

1. A method for reducing transmission time and improving network utilization while broadcasting over a fully connected network, comprising the steps of:
   simultaneously transmitting individual sequential packets by the broadcaster to each recipient in a round robin sequence until all the packets have been transmitted,
   retransmitting received packets by each recipient to each other recipient, and
   reassembling received packets at each recipient in the original sequence of said transmission
   said transmitting step and said retransmitting step being overlapped in time.

2. A method as claimed in claim 1 including storing packets received from said broadcaster by said recipient in two buffers namely, standard buffer and extra buffer and storing packets received from other recipients only in said standard buffer.

3. A method as claimed in claim 1 including retransmitting using a two step process, retransmitting to recipients with Ids lower than the transmitting recipient in the first step, and retransmitting to all recipients with Ids higher than the transmitting recipient in the second step.

4. A method as claimed in claim 1, wherein said transmitting and retransmitting step is in half duplex mode.

5. A method as claimed in claim 1, wherein said retransmitting step is in full duplex mode.

6. A method as claimed in claim 1 using a single buffer for storing received packets at a recipient, wherein packets received from said broadcaster are inserted at the beginning of said buffer while packets received from other recipients are stored after a defined position in said buffer.

7. A system for reducing transmission time and improving network utilization while broadcasting over a fully connected network, comprising:

means for transmitting individual sequential packets simultaneously by the broadcaster to each recipient in a round robin sequence until all the packets have been transmitted, means for retransmitting received packets by each recipient to each other recipient, and means for reassembling received packets at each recipient in the original sequence of said transmission said transmitting means and said retransmitting means operating simultaneously.

8. A system as claimed in claim 7 including means for storing said packets received by each recipient from said broadcaster in two buffers storage means namely, standard buffer and extra buffer while storing said packets received from other recipients in said standard buffer.

9. A system as claimed in claim 7 further including means for retransmitting said recipients with Ids lower than the transmitting recipient in the first step followed by retransmitting to all said recipients with Ids higher than the transmitting recipient.

10. A system as claimed in claim 7, wherein said transmitting and retransmitting means operate in half duplex mode.

11. A system as claimed in claim 7, wherein said retransmitting means operate in full duplex mode.

12. A system as claimed in claim 7 including means for storing said packets received by each recipient using a single buffer means, wherein packets received from said broadcaster are inserted at the beginning of said buffer means while packets received from other recipients are stored after a defined position in said buffer means.

13. A computer program product comprising computer readable program code stored on a computer readable storage medium embodied therein for reducing transmission time and improving network utilization while broadcasting over a fully connected network, comprising:

computer readable program code means configured for transmitting of individual sequential packets simultaneously by the broadcaster to each recipient in a round robin sequence until all the packets have been transmitted, computer readable program code means configured for retransmitting of received packets by each recipient to each other recipient, and computer readable program code means configured for reassembling received packets at each recipient in the original sequence of said transmission said transmitting and said retransmitting being overlapped in time.

14. A computer program product as claimed in claim 13 including computer readable program code means configured for storing said packets received by each recipient from said broadcaster in two buffers namely, standard buffer and extra buffer while storing said packets received from other recipients in said standard buffer.

15. A computer program product as claimed in claim 13 further including computer readable program code means configured for retransmitting to said recipients with Ids lower than the transmitting recipient in the first step followed by retransmitting to all said recipients with Ids higher than the transmitting recipient.

16. A computer program product as claimed in claim 13 including computer readable program code means configured for operating said transmission and retransmission in half duplex mode.

17. A computer program product as claimed in claim 13 including computer readable program code means configured for operating said retransmission in full duplex mode.

18. A computer program product as claimed in claim 13 including computer readable program code means for storing said packets received by each recipient using a single buffer, wherein packets received from said broadcaster are inserted at the beginning of said buffer while packets received from other recipients are stored after a defined position in said buffer.

* * * * *

UNITED STATES PATENT AND TRADEMARK OFFICE
CERTIFICATE OF CORRECTION

PATENT NO.      : 6,987,772 B2
DATED           : January 17, 2006
INVENTOR(S)     : Deepak M. Srinivasa It is certified that error appears in the above-identified patent and that said Letters Patent is hereby corrected as shown below:

<u>Column 8,</u>
Line 8, reads "3-2    4→2   2→3   3→2   2→3   2→3"
should read -- 3-2    3→2   2→3   3→2   2→3   2→3 --.

Signed and Sealed this

Eighteenth Day of April, 2006

JON W. DUDAS
*Director of the United States Patent and Trademark Office*